(12) United States Patent
Uhlin

(10) Patent No.: US 6,439,003 B1
(45) Date of Patent: Aug. 27, 2002

(54) BALL BALANCING ARRANGEMENT

(75) Inventor: Göran Uhlin, Lagan (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/530,205

(22) PCT Filed: Oct. 21, 1998

(86) PCT No.: PCT/SE98/01904
§ 371 (c)(1),
(2), (4) Date: Apr. 26, 2000

(87) PCT Pub. No.: WO99/23397
PCT Pub. Date: May 14, 1999

(30) Foreign Application Priority Data

Oct. 31, 1997 (SE) .............................................. 9704000

(51) Int. Cl.7 ................................................ D06F 37/22
(52) U.S. Cl. ...................................... 68/23.2; 74/573 R
(58) Field of Search ..................... 68/23.2; 74/573 R, 74/573 F

(56) References Cited

U.S. PATENT DOCUMENTS

| | | | | |
|---|---|---|---|---|
| 3,410,154 A | * | 11/1968 | Deakin .................... | 74/573 R |
| 3,799,619 A | * | 3/1974 | LaBarber ................. | 74/573 R |
| 4,117,742 A | * | 10/1978 | Stein ....................... | 74/573 R |
| 4,572,678 A | * | 2/1986 | Neder et al. ............. | 384/533 |
| 5,074,679 A | * | 12/1991 | McLarty ................... | 384/526 |
| 5,806,349 A | * | 9/1998 | Kim et al. ................ | 68/23.2 |
| 5,813,253 A | * | 9/1998 | Uhlin ....................... | 68/23.2 |

FOREIGN PATENT DOCUMENTS

| | | | |
|---|---|---|---|
| GB | 1370890 | * | 10/1974 |
| SU | 1461796 | * | 2/1989 |

* cited by examiner

*Primary Examiner*—Philip Coe
(74) *Attorney, Agent, or Firm*—Pearne & Gordon LLP

(57) ABSTRACT

A ball balancing arrangement for a wash drum (14) rotatable about an axis (18) in a laundry washing machine comprises at least one closed annular path (22) which is concentrically disposed with respect to the axis (18), adapted to rotate in synchronism with the wash drum (14) and containing a plurality of moveable ball-shaped balancing bodies (23) which are kept together in groups by a corresponding number of retaining means (34) of a shape so as to keep the ball-shaped balancing bodies (23) in each group (A, B, C) out of contact with one another. Each retainer means (34) is of a design so as to have a negligible weight relative to the weight of the balancing bodies and the surfaces (38, 39, 40, 41) of the retaining means (34) bearing against the balancing bodies (23) have a low friction.

11 Claims, 3 Drawing Sheets

BALL BALANCING ARRANGEMENT

The present invention refers to a ball balancing arrangement for a wash drum in a laundry washing machine, in which the wash drum is rotatable about an axis and the arrangement comprises at least one closed annular path being concentrically disposed with respect to the axis, adapted to rotate in synchronism with the wash drum and containing a plurality of moveable ball-shaped balancing bodies which are kept together in groups by a corresponding number of retaining means of a shape so as to keep the ball-shaped balancing bodies in each group out of contact with one another.

A ball balancing arrangement of the kind referred to is used for balancing of the rotating wash drum which supports the laundry. During the finalizing water extraction process the wash drum is driven up into high speed where the imbalance caused by the unevenly distributed laundry may subject the various supporting details of the washing machine to substantial stress.

Among prior art balancing arrangements reference can be made to the one disclosed in the patent publication GB-A-1598399. In this arrangement annular paths are provided at both ends of a wash drum in a laundry washing machine. The paths are partly filled with balls which can move freely in the respective path taking positions such as to counterbalance, during the water extracting process, the imbalance caused by the laundry. A similar arrangement is disclosed in the patent publication U.S. Pat. No. 2,984,094.

In the arrangements described in the publications referred to above the balls are allowed to move freely which means that they are permitted to get into contact with one another. As a result, if a larger group of balls contacting one another are disposed in the lower part of the path, at a later displacement of the balls into positions where balance is achieved, the mutual contact between the balls and the associated friction will cause a delay of the movement so that the desired condition of balance will not fully be achieved. This presents a significant drawback as a compliance as great as possible is desired for the balancing arrangement. In addition, during the setting movement acceleration and retardation of the balls can cause the balls, off and on, to collide with one another disturbing the setting process and also causing undesired noise.

Another solution has been presented which partly meets with the problem of the balls disturbing one another during the setting movement. This solution is disclosed in the patent publication U.S. Pat. No. 3,799,619. Here, the balancing bodies have the shape of elongate weights resting on balls and at the same time being designed to operate as ball retainers. For example, such balancing body may have a curved shape adapted to the annular path and a weight corresponding to say three ordinary balancing balls. Accordingly, in this case the balancing weight has the shape of a small carriage at its ends supported by steel balls. Normally, three such carriages are required for a good balancing to be achieved. The disadvantage of this design is that the ball retainer constitutes the balancing weight and hence that the balls have to support this weight when moving the balancing body into positions where balance is achieved. The inevitable friction losses between the balancing weight and the balls and between the latter and the path will increase. At the same time the advantage is that to a great extent ball collisions are avoided together with the associated delays and noise. An embodiment of the kind referred to is also described in the patent publication WO 96/03541.

The purpose of the invention is to remedy the drawbacks indicated in connection with the prior art balancing arrangements discussed above and to provide an arrangement in which the system is kept which has a plurality of balancing bodies freely moveable but where the bodies, which, contrary to the arrangements according to U.S. Pat. No. 3,799,619 and WO 96/03541, still represent the balancing weight, are retained in groups by ball retainers which are very light and have a low friction with respect to the balls. Accordingly, according to the invention a ball balancing arrangement of the kind referred to above is characterized in that each of the retaining means has a weight which is substantially negligible in comparison to the balancing bodies and in that the surfaces of the retaining means bearing against the balancing bodies have a low friction.

An advantage with the arrangement of the invention in which the balancing weight is divided into a plurality of ball-shaped partial weights which can move by rotating independently of each other in a light-weight ball retainer under low friction is that each partial weight is separately driven by the imbalance force that is present and accordingly that each group of balancing bodies is more compliant, i.e. it can carry out necessary movements faster than in the case where the imbalance weight has the shape of one single body supported by balls. The light-weight ball retainer does not essentially contribute to the balancing weight but has the object only to keep a group of balls together so that they can rotate without touching one another and with no substantial friction against the bearing surfaces of the ball retainer.

The invention will now be described more in detail in connection with an embodiment and with reference to the accompanying drawings.

FIG. 1 schematically shows a laundry washing machine in which the invention is intended to be implemented.

FIG. 2 schematically shows a wash drum which can be used in the laundry washing machine of FIG. 1 and which is provided with a ball balancing arrangement according to the invention.

FIG. 3 shows a section along the line III—III of FIG. 2.

FIG. 4 schematically shows a portion of an annular ball path provided in the laundry washing machine of FIG. 1 and having a ball retainer inserted with balancing weights.

Figure 1:
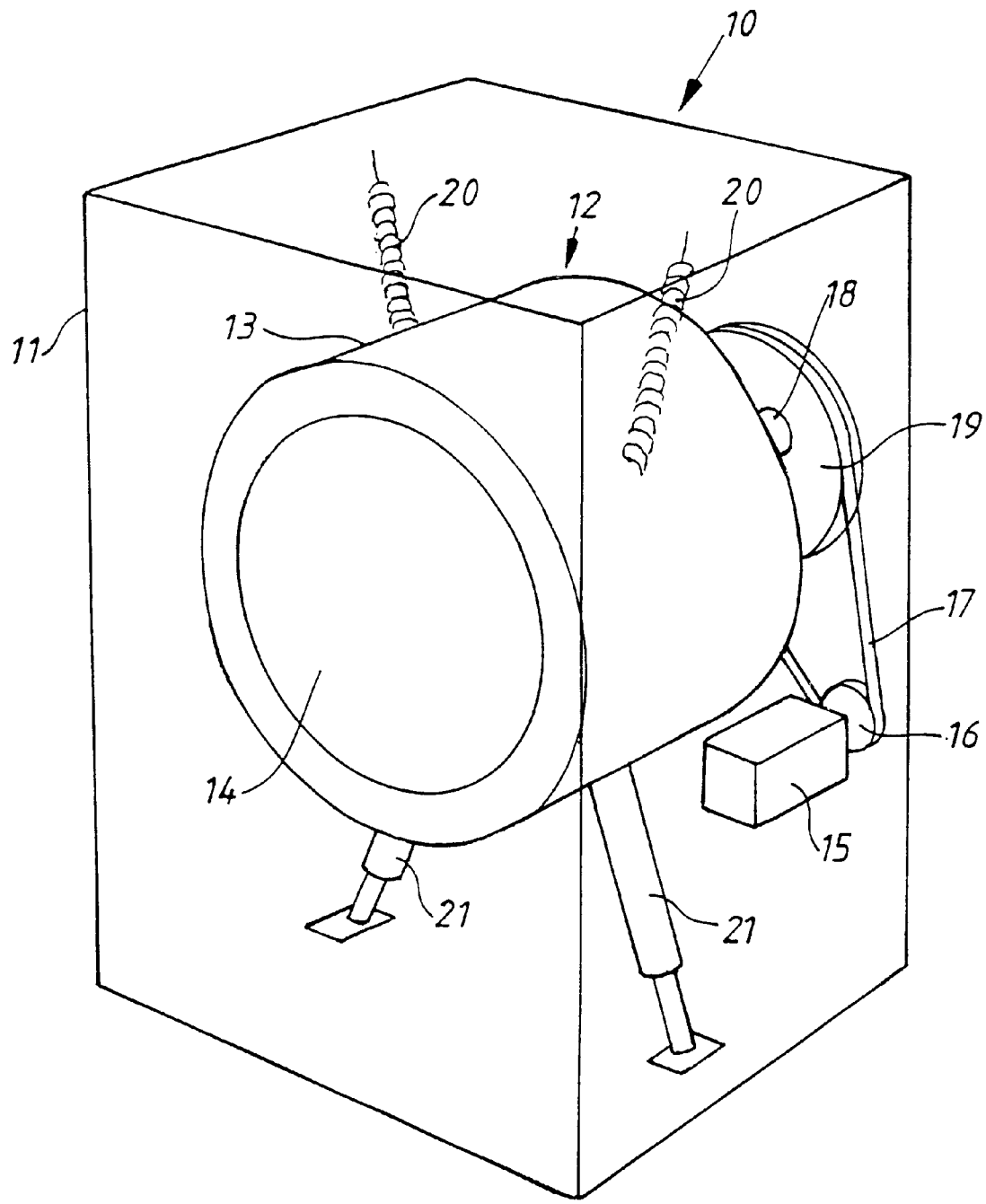

FIG. 1 schematically shows an ordinary front-loaded laundry washing machine 10 having an outer housing 11 enclosing an assembly 12. The assembly comprises a tub 13 in which a rotatable wash drum 14 is provided the purpose of which is to support the laundry to be treated in the laundry washing machine. In addition, the assembly 12 comprises a driving arrangement for rotating the wash drum and in the common way the driving arrangement includes a driving motor 15 driving the drum via a driving pulley 16, a belt 17 and a pulley 19 provided on the drum shaft 18.

The assembly 12 is mounted in the outer housing 11 so as to be able to move relatively unobstructed during operation of the laundry washing machine. To that end the assembly is supported in the outer housing 11 by means of springs 20 and vibration dampers 21.

Figure 2:
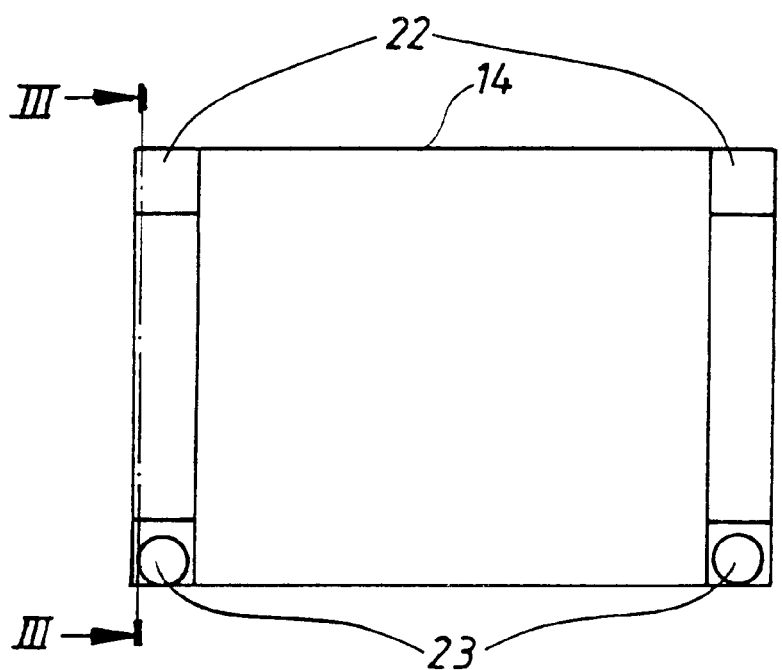

The wash drum is provided with a ball balancing arrangement of a kind which is principally known in order to handle the imbalance forces arising when the wash drum, with the unevenly distributed laundry, for the extraction of the water therein is driven up into spin drying speed. The balancing arrangement is schematically shown in FIG. 2 wherein the wash drum 14 is provided with closed circular tube-shaped paths 22 containing balancing balls 23 which can move freely along the path. The paths are provided at the side gables of the wash drum and fixedly attached to the drum. At least one path is required but for a dynamic balancing of the drum with its wash load to be achieved paths are provided at both gables of the drum.

Figure 3:
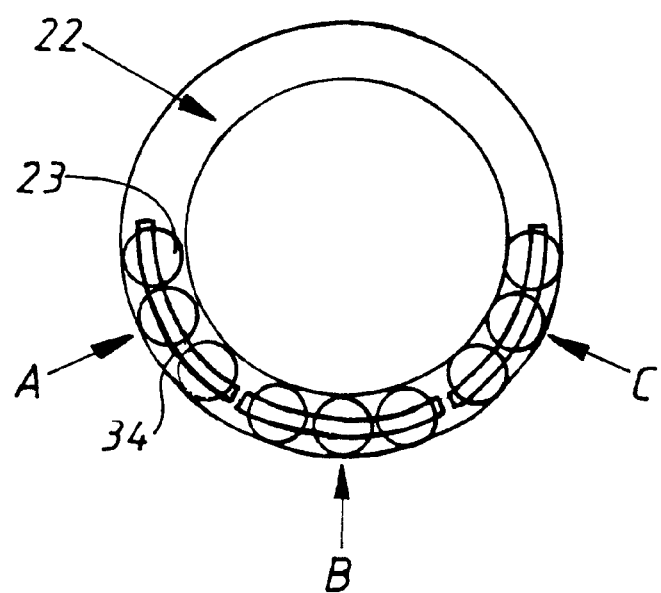

FIG. 3 shows the left one of the paths 22 with the balls 23 contained therein. The number of balls is often chosen so that the balls will fill almost half of the path. In accordance with the invention the balls shall not contact one another but be separated by a slit formed by means of a ball retainer which keeps the balls together in groups. Each group can contain two balls or more but it has been found optimal to provide three balls in each group. In FIG. 2 a total of nine balls are shown which form three groups A, B and C, respectively. The balls are kept together by corresponding ball retainers designated by 34.

Figure 4:
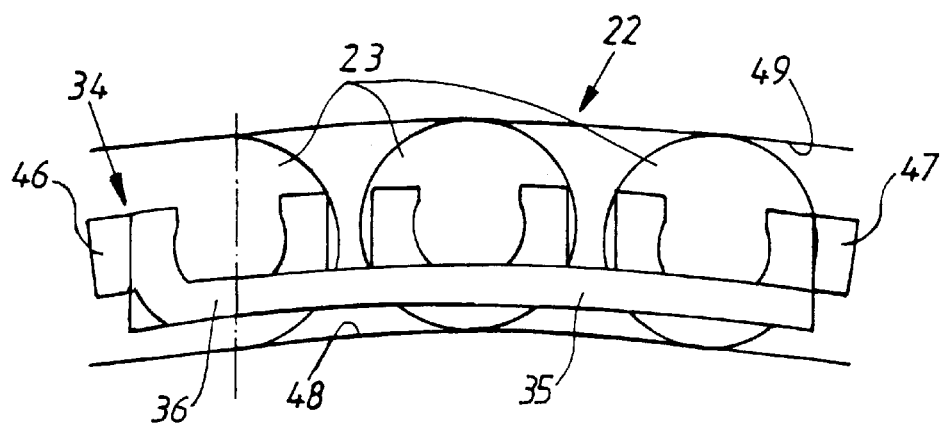
Figure 5:
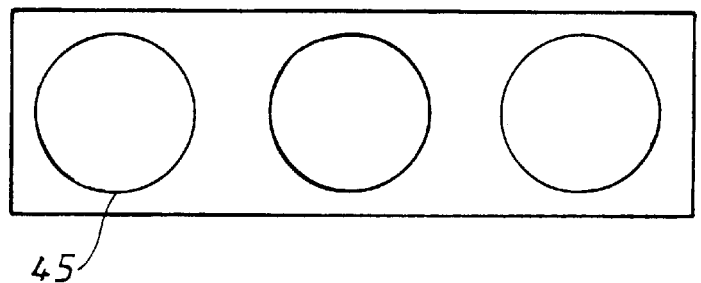
FIG. 5 is a detail view of the ball retainer with balls according to FIG. 4 as seen from below.
Figure 6:
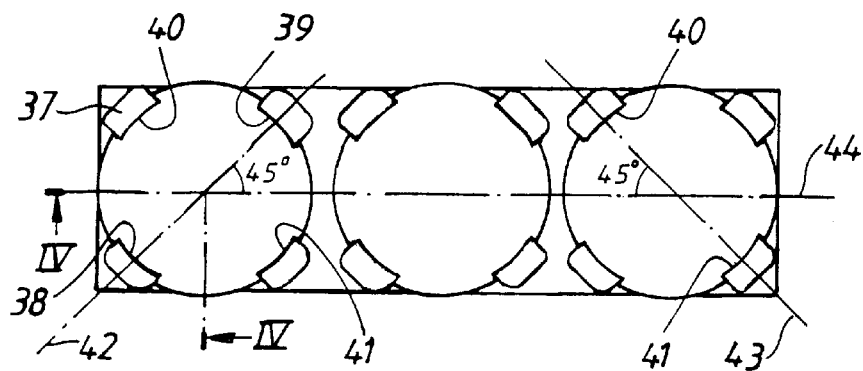
FIG. 6 is a detail view of the ball retainer with balls according to FIG. 4 as seen from above.

The shape of the ball retainers as well as the way the balls are disposed therein is shown in FIGS. 4–6. FIG. 4 shows in a side view a section of a path 22 with a ball retainer 34 in which three balls 23 are provided of which the one to the left is shown with its left half cut away. Also the ball retainer is shown with certain portions cut away according to the line IV—IV of FIG. 6. The ball retainer 34 is preferably made from plastics material and comprises a plate 35 having a recess 36 for each ball 23 and a central circular hole 45 permitting the lower part of the ball to extend through the hole 45 into contact with an inner border surface 48 of the path 22. The recess 36 has a shape corresponding to the shape of the ball forming an annular spherical support surface. A corresponding outer border surface 49 constitutes a run-way for the balls 23 moving along the path 22. The balls are of a size such that they can move easily without any substantial play relative to the walls of the path. The ball retainer 34 has got a somewhat curved shape adapted to the curvature of the path. At each end the plate 35 extends somewhat beyond the corresponding outer ball 23 so that contact between outer balls of two adjacent ball groups is avoided. In addition, at each end of the ball retainer damping elements 46, 47 are provided for absorbing the energy released when two ball groups collide. The damping elements 46, 47 also contribute in reducing noise normally arising from the collision. The damping elements can be made from rubber, from a thermoelastic plastics material or from cellular rubber.

In order to support the ball 23 in the ball retainer 34, in addition to the recess 36 the plate 35 is provided with four legs 37 disposed cross-wise and extending upwards forming surfaces 38, 39, 40, 41 connecting to the shape of the ball and so contributing to the support of the ball in all directions. To this end the legs 37 extend upwards to a height bringing the envelope surface of the upper half of the ball to bear against the support surfaces 38, 39, 40, 41 formed by the legs 37. The legs 37 are of a size and shape such that the ball 23 can easily be snapped into position in the ball retainer 34 by a certain deflection of the legs 37 without any loss in resilience of the legs which then can return resiliently so that the support surfaces of the legs are brought into contact with the envelope surface of the ball.

FIG. 5 shows the ball retainer 34 according to FIG. 4 as seen from below and with no balls for the purpose of showing the holes 45.

FIG. 6 shows the ball retainer 34 according to FIG. 4 as seen from above and wherein a ball 23 has been provided in the centre recess 36. As shown, the legs 37 are disposed cross-wise such that a symmetry line 42;43 through two opposite supporting surfaces 38,39;40,41 on the plate 35 forms an angle of 45 degrees with a corresponding symmetry line 44 extending through the balls in their direction of rotation in the path 22. Positioning of the legs 37 in this way has proved to be extremely advantageous as the plate 35 can be made with the use of a minimum amount of material for its function to effectively retain the balls 23 in position in each group A, B, C without adding any appreciable weight to the group of balls. In viewing the ball retainer 34 of FIG. 6 divided into three parts by a sawing operation along symmetry lines between each recess one will find that each part consists of four corner portions where the legs are situated and which are separated by intermediate portions of lesser wall thickness. The necessary rigidity is given to the ball retainer 34 by the plate 35 which forms a kind of frame. The plastics material for the ball retainer 34 has been chosen to give a low friction between the support surfaces of the ball retainer and the envelope surface of the balls 23. Preferably, the plastics material is acetate plastics and in order to further reduce the friction between the ball and the annular spherical support surface for the ball in the ball retainer the support surface can be covered with a material similar to TEFLON®.

The described ball balancing arrangement operates as follows. With reference to FIGS. 3 and 4, when the drum 14 is brought into rotation the balls 23 will be forced to join the movement. In order to facilitate the joining the path is, at least partly, filled with liquid of a suitable viscosity, such as oil. The filling of oil also contribute to reducing the inevitable noise which arises when the balls run in the path. The low friction between the balls and the ball retainer permits an oil of a relatively low viscosity to be used and accordingly a finer balancing to be achieved.

When the rotational speed is increased possible imbalance caused by unevenly distributed clothes in the drum 14 will result in imbalance forces intended to be compensated by the balls 23 moving relative to the path 22 into positions in which the imbalance forces become counterbalanced. Due to the fact that the balls 23 are kept together in groups by the ball retainers 34 any direct contact will not take place between the balls and when a movement of the balls 23 relative to the path 22 is initiated the start friction between the balls will be limited to the low friction between the support surfaces of the ball retainer and the respective ball. This means that the balls 23 can quickly change position at need. By the small size of the ball groups A, B, C, preferably comprising only three balls 23, the ball groups will be able to take any of all positions required for covering of all occurring cases of imbalance. By use of the ball retainer according to the invention the friction losses will be the same from one balancing event to another and accordingly, repeatable balancing results will be obtained.

What is claimed is:

1. A ball balancing arrangement for a wash drum (14) in a laundry washing machine, in which the wash drum (14) is rotatable about an axis (18) and the arrangement comprises at least one closed annular path (22) being concentrically disposed with respect to the axis, adapted to rotate in synchronism with the wash drum (14) and containing a plurality of moveable ball-shaped balancing bodies (23) which are kept together in groups by a corresponding number of retaining means (34) of a shape so as to keep the ball-shaped balancing bodies (23) in each group (A, B, C) out of contact with one another, characterized in that each retainer means (34) is of a design so as to have a negligible weight relative to the weight of the balancing bodies (23) and in that the surfaces (38, 39, 40, 41) of the retaining means (34) bearing against the balancing bodies (23) have a low friction.

2. A ball balancing arrangement according to claim 1, characterized in that the retaining means (34) is made from a plastics material of low friction with respect to the ball-shaped balancing bodies (23).

3. A ball balancing arrangement according to claim 2, characterized in that the retaining means (34) is made from an acetate plastics material.

4. A ball balancing arrangement according to claim 2 or claim 3, characterized in that the retaining means (34) is provided with suitable recesses (36) in which the ball-shaped balancing bodies (23) can be snapped in place.

5. A ball balancing arrangement according to claim 4, characterized in that each recess (36) comprises a base part provided with a central hole (45) for the ball having a spherical shape adapted to the shape of the ball, said base part being provided with at least four support legs (37) projecting upwards from the base part and having support surfaces (38, 39; 40, 41) for the ball forming part of a sphere.

6. A ball balancing arrangement according to claim 5, characterized in that in each recess (36) the support legs (37) are disposed cross-wise such that a symmetry line (42, 43) passing through two opposite support surfaces (38, 39, 40, 41) of the support legs forms an angle of 45 degrees with a corresponding symmetry line (44) running through the ball-shaped balancing bodies (23) in their direction of rotation.

7. A ball balancing arrangement according to claim 1, characterized in that each group (A, B, C) comprises three or more ball-shaped balancing bodies (23).

8. A ball balancing arrangement according to claim 1, characterized in that a total of three groups (A, B, C) are provided in each path (22).

9. A ball balancing arrangement according to claim 1, characterized in the retaining means (34) at its ends extends beyond the corresponding outer ball (23).

10. A ball balancing arrangement according to claim 9, characterized in that at least one end of the retaining means (34), as seen in the direction of rotation of the balls, a damping element (46, 47) is provided made of an elastic material.

11. A ball balancing arrangement according to claim 10, characterized in that the damping element (46, 47) is made of rubber, of a thermoelastic plastics material or of cellular rubber.

* * * * *